July 11, 1967 J. A. BROCKMAN ETAL 3,330,325
BURNERS FOR DOMESTIC AND INDUSTRIAL HEATING PURPOSES
Filed Aug. 23, 1965 3 Sheets-Sheet 1

INVENTORS
JOHN ALBERT BROCKMAN ETAL
By: Mawhinney & Mawhinney
ATTYS.

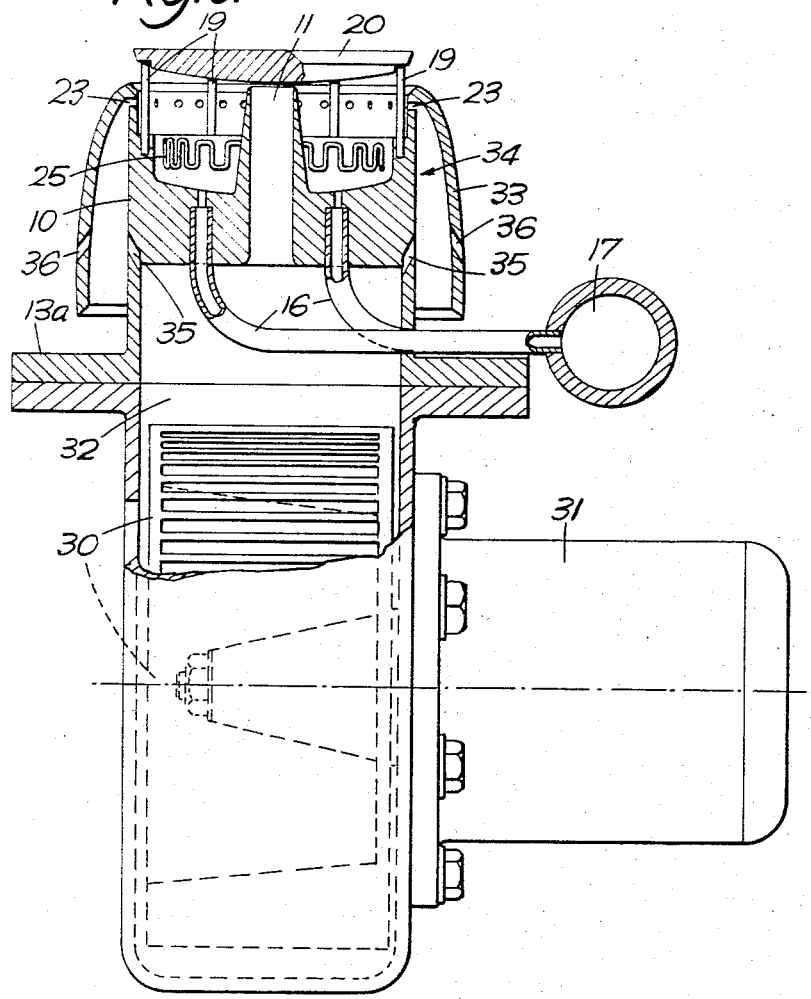

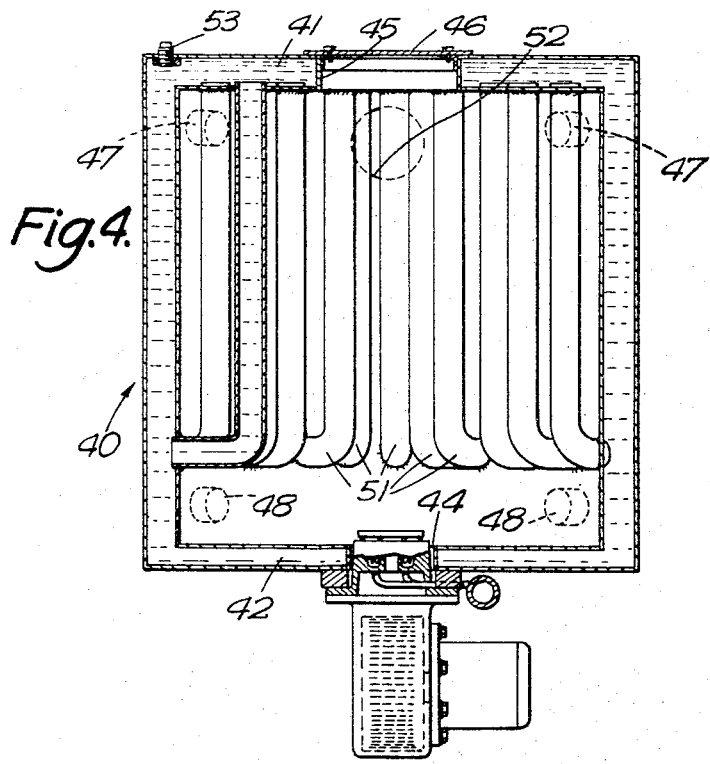
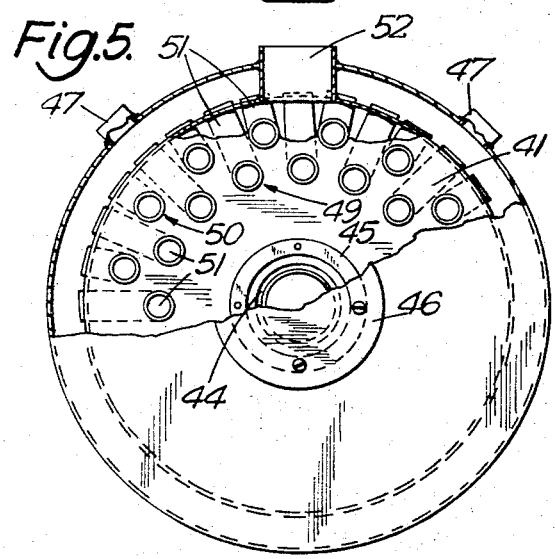

United States Patent Office 3,330,325
Patented July 11, 1967

3,330,325
BURNERS FOR DOMESTIC AND INDUSTRIAL
HEATING PURPOSES
John Albert Brockman, Villa Dunkirk, Upper Harble
Down, Kent, England, and Ronald Skinner, Long Tye
Drive, Chestfield, Kent, England
Filed Aug. 23, 1965, Ser. No. 481,621
Claims priority, application Great Britain, Aug. 24, 1964,
34,625/64
8 Claims. (Cl. 158—66)

This invention relates to burners for domestic and industrial heating purposes and has a particularly useful but not exclusive application in burners consuming liquid fuels such as paraffin or kerosene.

According to this invention there is provided a burner comprising a bowl, a cover above the bowl the outer edge of which cover is spaced above the lip of the bowl, means for supplying fuel into the bowl which fuel supply means includes one or more apertures opening to the interior of the bowl, and means for supplying air under pressure to the bowl, which air supply means includes one or more apertures opening to the interior of the bowl.

The invention also provides the combination with a burner as set forth above of a boiler for containing water, the boiler being disposed above the burner and having a water inlet at or near the bottom of the boiler and a water outlet at or near the top of the boiler.

Where the burner is to be used with liquid fuels, there is preferably provided means for maintaining the level of the liquid fuel in the bowl constant.

According to a preferred feature of the invention the air supply means comprises a tube disposed in the bowl and having an outlet aperture which is disposed centrally of the bowl above the level of the liquid fuel and which is directed towards the undersurface of the cover, air being supplied to the interior of the bowl through the tube. Preferably the tube projects upwardly from the centre of the bottom of the bowl.

In preferred constructions the tube is formed integrally with the bottom of the bowl and a continuation of the bore of the tube extends through the bottom wall of the bowl.

According to another preferred feature of the invention the air supply means further comprises supplementary air supply holes extending through the wall of the bowl above the level of the liquid fuel.

In one preferred construction according to the invention, the undersurface of the cover is flat.

In another preferred construction according to the invention, the undersurface of the cover is convex. The cover may conveniently be supported by upright pins carried by the bowl. Such pins can exert a useful effect in improving the form of the turbulence within the bowl.

According to another preferred feature of the invention an electric heater wire is disposed in the bowl for heating and igniting the fuel.

According to yet another preferred feature of the invention the burner is provided in combination with a motor driven compressor mounted below the bowl. In such arrangements, a plenum chamber may be formed below the bowl to which plenum chamber the bore of the air tube opens, and wherein the compressor is a centrifugal compressor whereof the delivery conduit opens to the plenum chamber.

Some embodiments of the invention will now be described by way of example with reference to the accompanying drawings in which:

FIGURE 3 shows a partly-sectional elevation of a second burner embodying the invention, FIGURE 4 shows diagrammatically a burner embodying the invention installed in a boiler for a central heating system, and FIGURE 5 shows a plan of the boiler.

Corresponding parts in the various arrangements are denoted by the same reference numerals.

Figure 1:
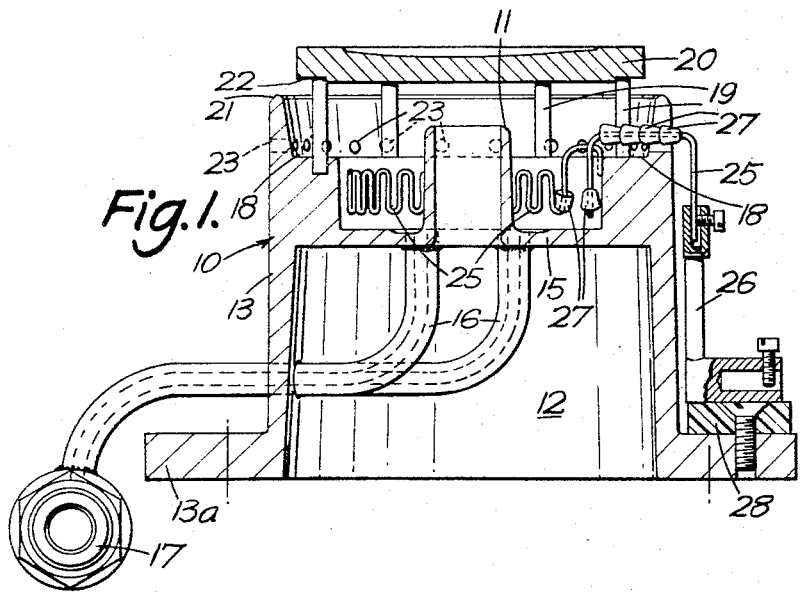
FIGURE 1 shows a sectional elevation of a first burner embodying the invention.
Figure 2:
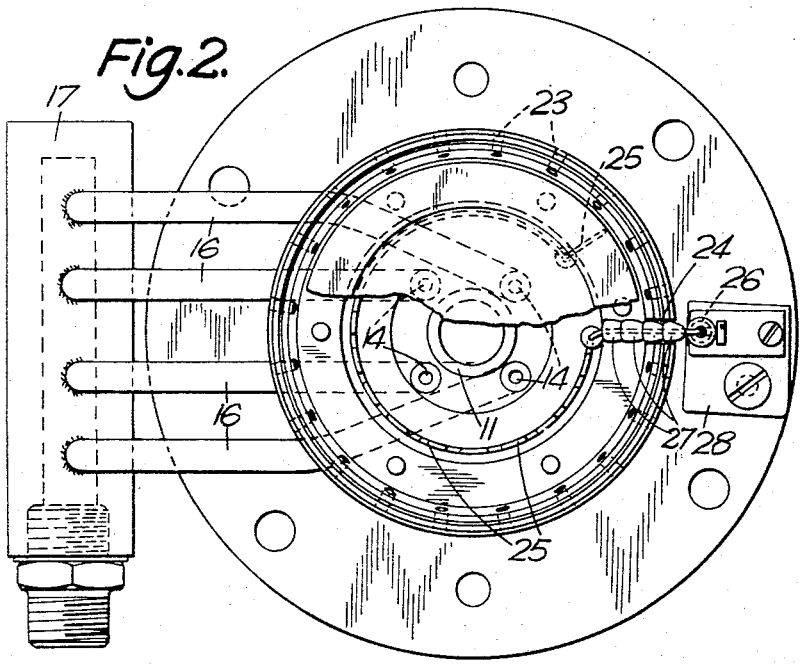
FIGURE 2 shows a plan of the burner in FIGURE 1, part of the cover being broken away to show the construction.

Referring now to FIGURES 1 and 2, the burner has a bowl 10 formed with a central upstanding air-supply tube 11 opening at the top to the interior of the bowl and at the bottom to a recess 12 which in use of the burner provides a plenum chamber formed by an annular skirt 13 depending from the bottom of the bowl. The lower edge of the skirt has an outwardly-extending connecting flange 13a, to which, in use of the burner, the outlet of an electric motor-driven compressor or fan is connected.

Four fuel inlet holes 14 are formed in the bottom wall 15 of the bowl, and these holes are counterbored from their lower ends to receive the outlet ends of respective fuel supply pipes 16, which are brazed in position. The supply pipes 16 extend in sealing fashion through the skirt 13 and are connected at their other ends to a fuel manifold block 17. The manifold block receives fuel under gravity from a device (not shown) which is secured in a fixed position relative to the burner and which is of known design incorporating a float valve for maintaining the level of the fuel in the bowl constant. The arrangement is such that the liquid fuel covers the bottom of the bowl only thinly.

The diameter of the bowl increases suddenly at about half its height to form a step 18, and six pins 19 are mounted on the step and support on their upper ends a cover 20. Two of these pins are screwed into the step and extending through holes in the cover, and nuts 19a are secured on these pins to hold the cover in place; the other four pins are screwed in the cap and rest on the step. The outer edge of the cover is spaced above the lip 21 of the bowl. In the construction shown, the underside of the cover is flat but has a shallow peripheral rebate 22, and the pins 19 extend close to the step of the rebate.

A ring of equi-angularly spaced small holes 23 extend radially through the wall of the bowl just above the step 18 and provide for the entry of supplementary air into the bowl.

A narrow radial slot 24 is cut through the side wall of the bowl above the step 18, and a heater wire 25 extends from a connector terminal 26 through the slot, round the bowl in serpentine fashion close to the internal surface of the lower part of the wall of the bowl, and is earthed at its other end to the bowl. The wire is encircled by small pot insulators 27 where it extends through the slot. The connector is mounted on the flange 13a of the skirt but is electrically insulated therefrom by an insulator block 28.

In operation of the burner the recess 12 on the underside of the bowl is connected to a source of air under pressure, say a pressure of 3″ water gauge, so that the air passes up the tube 11 into the bowl, and fuel is passed through the pipes 16 into the bottom of the bowl. The heater wire 25 is heated by an electric current to vaporize and ignite the fuel. The air entering the bowl through the tube 11 is deflected by the cover and mixes with the vapour, and supplementary air enters the bowl through holes. The resulting highly combustible mixture of air and gasified fuel burns with a bright blue flame at the gap between the lip of the bowl and the cover.

A spark igniter may replace the heater wire if desired.

Under steady conditions, the fuel vaporizes in the fuel inlet holes 14, and the air passing into the plenum chamber and up tube 11 cools the bottom wall 15 and fuel supply pipes 16 to prevent too early vaporization of the fuel.

The blue flame is obtained when the thickness of the bottom of the bowl, the pressure of the compressed air, and the fuel are carefully matched. If the fuel is vaporized too early, the flame may become extinguished, and if too late, the flame is white and sooty.

FIGURE 3 shows a larger and slightly modified form of burner intended for industrial use with a fuel of higher vaporization temperature than the preceding arrangements. The drawing shows also a centrifugal compressor 30 driven by an electric motor 31 and connected to the flange 13a of the burner. The delivery passage 32 of the compressor opens to the recess 12 under the bowl, so that the recess forms part of a plenum chamber for compressed air at a pressure of at least 8″ water gauge to pass through the tube 11 into the bowl. In this construction, the underside of the cover 20 is convexly curved instead of flat. In addition a hood 33 is disposed round the outside of the bowl, so as to form an annular chamber 34 round the bowl. The top of this chamber is closed except for the holes 23 which lead from 34 into the interior of the bowl; the bottom of the annular chamber 34 is open. Rings of upwardly inclined holes 35, 36 extend into this annular chamber from the plenum chamber and from outside the hood respectively. This arrangement provides a stronger current of supplementary air for burners intended to employ certain fuels.

The application of a burner according to the invention to a water heater, for example for a central heating installation, is shown in FIGURES 4 and 5. The boiler of the water heater is annular in form and comprises a drum shaped annular tank 40 having upper and lower portions 41, 42 interconnected by an upright cylindrical portion 43. The burner is disposed in the central hole 44 in the lower portion 42, and the central hole 45 in the upper portion 41 provides a cleaning access hole which is normally sealed by a closure plate 46 removably secured in position. The tank has two radially extending outlet pipes 47 near the top of the tank and spaced apart from each other around the periphery of the tank, and two inlet pipes 48 disposed near the bottom of the tank and respectively below the two outlet points. Two banks 49, 50 of water tubes 51 are disposed in the space enclosed by the central cylindrical portion of the tank and open at their lower ends to the interior of the tank near the bottom of the upright portion 43 of the tank and open at their upper ends to the upper portion 41 of the tank round the cleaning access hole 45. The two banks of tubes are radially offset from each other and the tubes in the radially inner bank 49 are circumferentially staggered relative to those in the outer bank 50.

An air bleed plug 53 is disposed in the top wall of the upper portion of the tank.

An exhaust gas duct 52 extends through the upright portion of the tank from the space enclosed by the tank, and exhaust gases from the burner flow through this duct to a flue (not shown).

The boiler is mounted in a frame which is not shown in the drawings, and the burner, which is disposed in the bottom aperture 44 of the tank is similarly mounted on this frame. A compressor unit comprising an electric motor 31 driving a centrifugal compressor 30 is secured to the bottom flange 13a of the burner in the manner described in relation to FIGURE 3 of the drawings.

The burning gases from the burner flow upward through the space within the boiler and out through the gas ducts 52 to the flue. The burning gases heat the water in the water tubes 51 so that steady convection currents flow upward through the water tubes and downward through the upright tank portion.

Water is circulated from the outlets 47 of the boiler through radiators or other heat exchange devices and is drawn from these devices and forced back into the bottom of the tank by a pump which is not shown.

In an alternative arrangement, not illustrated, the lower ends of the water tubes open to the lower portion 42 of the tank instead of to the upright portion 43.

In some constructions a ring of wire made from a metal having a very high resistance to erosion at elevated temperatures may be secured on or just inside the lip of the bowl of the burner.

We claim:
1. A burner comprising:
 (a) a bowl
 (b) a cover extending above substantially the whole of the bowl, the outer edge of which cover is spaced above the lip of the bowl
 (c) the undersurface of the cover being convexly curved
 (d) a tube projecting upwardly from the centre of the bowl towards the cover, the bore of the tube passing through the bottom of the bowl
 (e) a plenum chamber formed below the bowl, into which plenum chamber the bore in the tube opens
 (f) fuel supply pipes leading to apertures in the bottom of the bowl around said tube, and opening into the interior of the bowl
 (g) a length of each supply pipe being disposed within the bottom wall of the bowl
 (h) a length of each supply pipe being disposed within the plenum chamber.

2. A burner according to claim 1, further comprising supplementary air supply holes extending through the wall of the bowl.

3. A burner according to claim 2, further comprising means for forcing supplementary air through said holes.

4. A burner according to claim 1 wherein the cover is supported by upright pins carried by the bowl.

5. A burner according to claim 4 wherein the interior of the bowl is of larger diameter in its upper portions than its lower portions and has a step between said upper and lower portions, and wherein the pins are mounted in said step.

6. A burner according to claim 1 wherein an electric heater wire is disposed in the bowl for initially heating the bowl and fuel to vaporize the fuel and also to ignite the vaporized fuel emerging from said apertures.

7. A burner according to claim 1 in combination with a motor driven compressor mounted below the bowl and in communication with the plenum chamber.

8. A burner comprising:
 (a) a bowl
 (b) a cover extending above substantially the whole of the bowl, the outer edge of which cover is spaced above the lip of the bowl
 (c) the undersurface of the cover being flat
 (d) a tube projecting upwardly from the centre of the bowl towards the cover, the bore of the tube passing through the bottom of the bowl
 (e) a plenum chamber formed below the bowl, into which plenum chamber the bore in the tube opens
 (f) fuel supply pipes leading to apertures in the bottom of the bowl around said tube, and opening into the interior of the bowl
 (g) a length of each supply pipe being disposed within the bottom wall of the bowl (h) a length of each supply pipe being disposed within the plenum chamber.

References Cited

UNITED STATES PATENTS

| | | | |
|---|---|---|---|
| 1,662,986 | 3/1928 | Smoyer et al. | 158—66 |
| 1,737,911 | 12/1929 | Birch | 158—66 |
| 1,756,226 | 4/1930 | Tiller | 158—91 |
| 1,861,997 | 6/1932 | Behrsin | 158—91 |
| 2,064,914 | 12/1936 | Heinzel | 158—91 |
| 2,423,808 | 7/1947 | De Lancey | 158—91 |
| 2,693,849 | 11/1954 | Resek et al. | 158—91 |

FOREIGN PATENTS 759,339  11/1933  France.

KENNETH W. SPRAGUE, *Primary Examiner.*